R. B. Perkins,
Spoon.
No. 37,373.     Patented Jan. 6, 1863.

Witnesses.
S. H. Maynard
A. C. Thompson

Inventor.
Russell B. Perkins
by his Attorney
J. P. Pirsson

UNITED STATES PATENT OFFICE.

RUSSELL B. PERKINS, OF MERIDEN, CONNECTICUT, ASSIGNOR TO PARKER & PERKINS.

IMPROVED TINNED-IRON SPOONS.

Specification forming part of Letters Patent No. 37,373, dated January 6, 1863.

*To all whom it may concern:*

Be it known that I, RUSSELL B. PERKINS, of Meriden, in the county of New Haven and State of Connecticut, have invented a new and useful Improvement in the Construction of Tinned-Iron Spoons; and I do hereby declare that the following is a full, clear, and exact description of the same, reference being made to the annexed drawings, making a part of this specification, in which—

Figure 1:
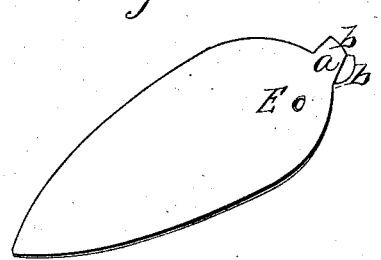
Figure 2:
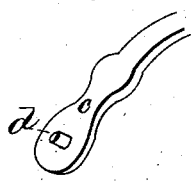

Figure 1 is a perspective view of a bowl of a spoon, and Fig. 2 is a like view of a part of the handle.

My invention is an improved mode of joining the handle and bowl of tinned-iron spoons. In the manufacture of these one of the chief difficulties is to join or attach the two pieces of which this kind of spoon is necessarily formed with sufficient strength to make a serviceable article combined with lightness of material. The point of weakness is at the neck of the bowl, where the handle is also smallest. As the tinning of the two parts is that which is chiefly relied on to keep them united, it is important that the soldering surface should be as large as possible. Two improvements for accomplishing these results have already been invented by me, each of which, while being efficacious, is different in principle. One consists in making a narrow pointed tongue at the neck of the bowl and fitting this into a recess in the handle, and afterward swaging the edges over the tongue and then tinning the whole. The other was to form a recess in the neck of the bowl and fit the end of the handle on the inside, thus increasing the strength of the bowl at this part, as well as enlarging the surface of the parts in contact.

My present improvement differs from both these plans, and it consists in extending the neck of the bowl to form a short flat tongue wide enough when fully shaped to partially inclose the handle, and made to fit accurately by a stamp and dies. A rivet being passed through to secure the two parts, they are tinned as usual, when it will be found that the joining has been so accurate that the place cannot be readily discovered.

At $a$ is seen the tongue projecting from the neck of the bowl. At $b$ is shown the manner in which this is turned down to lap over the edge of the handle. At $c$ is the part of the handle the tongue is to lap over and fit, and it conforms accurately to the shape or figure. At $d$ is a rivet in the handle, for which a hole to correspond is made at $e$ in the bowl. The end of the handle is now placed under the bowl, and the parts $b$ are then in place. The spoon is now put in the dies under the drop-press, and, the blow being given, the head of $d$ is riveted to $e$ and the tongue made to conform accurately to the part $c$ of the handle. The tinning is then to be performed as usual.

I claim—

Joining the handle and bowl of an iron spoon together, in the manner specifically as set forth herein.

In testimony whereof I have hereunto subscribed my name.

R. B. PERKINS.

Witnesses:
JOHN W. MILES,
ALMERON MILES.